(12) United States Patent
Stickle

(10) Patent No.: US 9,009,840 B1
(45) Date of Patent: Apr. 14, 2015

(54) VALIDATING MACHINE IMAGES

(75) Inventor: Thomas C. Stickle, Saint James, NY (US)

(73) Assignee: Amazon Technologies, Inc., Reno, NV (US)

( * ) Notice: Subject to any disclaimer, the term of this patent is extended or adjusted under 35 U.S.C. 154(b) by 520 days.

(21) Appl. No.: 13/356,497

(22) Filed: Jan. 23, 2012

(51) Int. Cl.
*G06F 7/04* (2006.01)
*G06F 21/12* (2013.01)
*G06F 21/50* (2013.01)
*G06F 21/53* (2013.01)
*G06F 21/10* (2013.01)

(52) U.S. Cl.
CPC ............... *G06F 21/12* (2013.01); *G06F 21/50* (2013.01); *G06F 21/53* (2013.01); *G06F 21/10* (2013.01)

(58) Field of Classification Search
CPC ......... G06F 21/12; G06F 21/50; G06F 21/53; G06F 21/10
USPC .......................... 726/26, 27, 28, 29, 30, 17, 21
See application file for complete search history.

(56) References Cited

U.S. PATENT DOCUMENTS

| | | | | |
|---|---|---|---|---|
| 8,341,747 | B2 * | 12/2012 | Cornwall et al. | 726/25 |
| 2007/0294676 | A1 * | 12/2007 | Mellor et al. | 717/139 |
| 2009/0172814 | A1 * | 7/2009 | Khosravi et al. | 726/23 |
| 2012/0266170 | A1 * | 10/2012 | Zimmerman et al. | 718/1 |

* cited by examiner

*Primary Examiner* — Jung (Jay) Kim
*Assistant Examiner* — Ayoub Alata
(74) *Attorney, Agent, or Firm* — Lee & Haynes, PLLC

(57) ABSTRACT

In a resource-on-demand environment, virtual machine images are validated before use. A provider or source of a virtual machine image may generate a manifest, indicating executable components of the machine image. Before use, a created virtual machine may compare its executable components with those specified by the manifest. To ensure authenticity, the manifest may be associated with a signature, and the virtual machine may use the signature to verify the manifest and the source of the machine image.

22 Claims, 4 Drawing Sheets

VALIDATING MACHINE IMAGES

BACKGROUND

Internet or web-based services are increasingly based on multi-tenant cloud-based infrastructure services, also referred to as Infrastructure as a Service (IaaS) or resource-on-demand services. Resource-on-demand or IaaS services are typically provided by data centers that host large numbers of physical servers and associated resources. The physical servers are managed by virtualization software, which dynamically creates virtual servers for requesting customers. Using virtualization, a single hardware server can host multiple virtual servers. Individual virtual servers are referred to as server instances or virtual machines, and are created based on virtual machine memory images that are provided or specified by customers.

In an IaaS environment, virtual machine images may be used to specify the guest operating system and software applications that will run on behalf of customers. Virtual machine images are highly configurable and are usually built by extending and customizing an existing virtual machine image. For example, a customer could take an existing image that contains an installation of an operating system and then install their own software product, configure it, and then transform the result into a new image that is shared with a customer community.

Customers have the option to store and run their images privately, or they can share such images with other customers. In some cases, customers may make virtual machine images public, to be shared by the customer community at large. This requires a certain level of trust by consumers of the images, with respect to the image producers and any other parties who may have been involved in conveying the images to the consumers. For example, a consumer should trust that the producer did not install malware or open a covert channel into the operating environment. The consumer should also trust that the machine image was protected properly by intermediate parties, to prevent a rogue employee or third party from maliciously tampering with the machine image.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques for verifying the sources of machine images and for ensuring that machine images have not been maliciously tampered with by unauthorized parties.

A machine image that is to be distributed to and used by other parties is inventoried to produce an image manifest. The image manifest lists the executable components or processes of the machine image. The image manifest is digitally signed by the producer of the machine image to create a digital signature that is made available to users or consumers of the machine image. Consumers can verify the integrity of a particular manifest by checking it against the signature. In some environments, a cryptographic certificate may allow the consumer to determine the identity of the party that signed the manifest.

Prior to boot up of a virtual machine based on the machine image, or during initialization of the virtual machine, the virtual machine may be inventoried to identify its executable components. The results of the inventorying may be compared to the image manifest associated with the machine image. This allows the consumer of the machine image to reliably identify the producer of the image, and to verify that the image has not been modified or tampered with subsequent to being made available by its producer.

Figure 1:
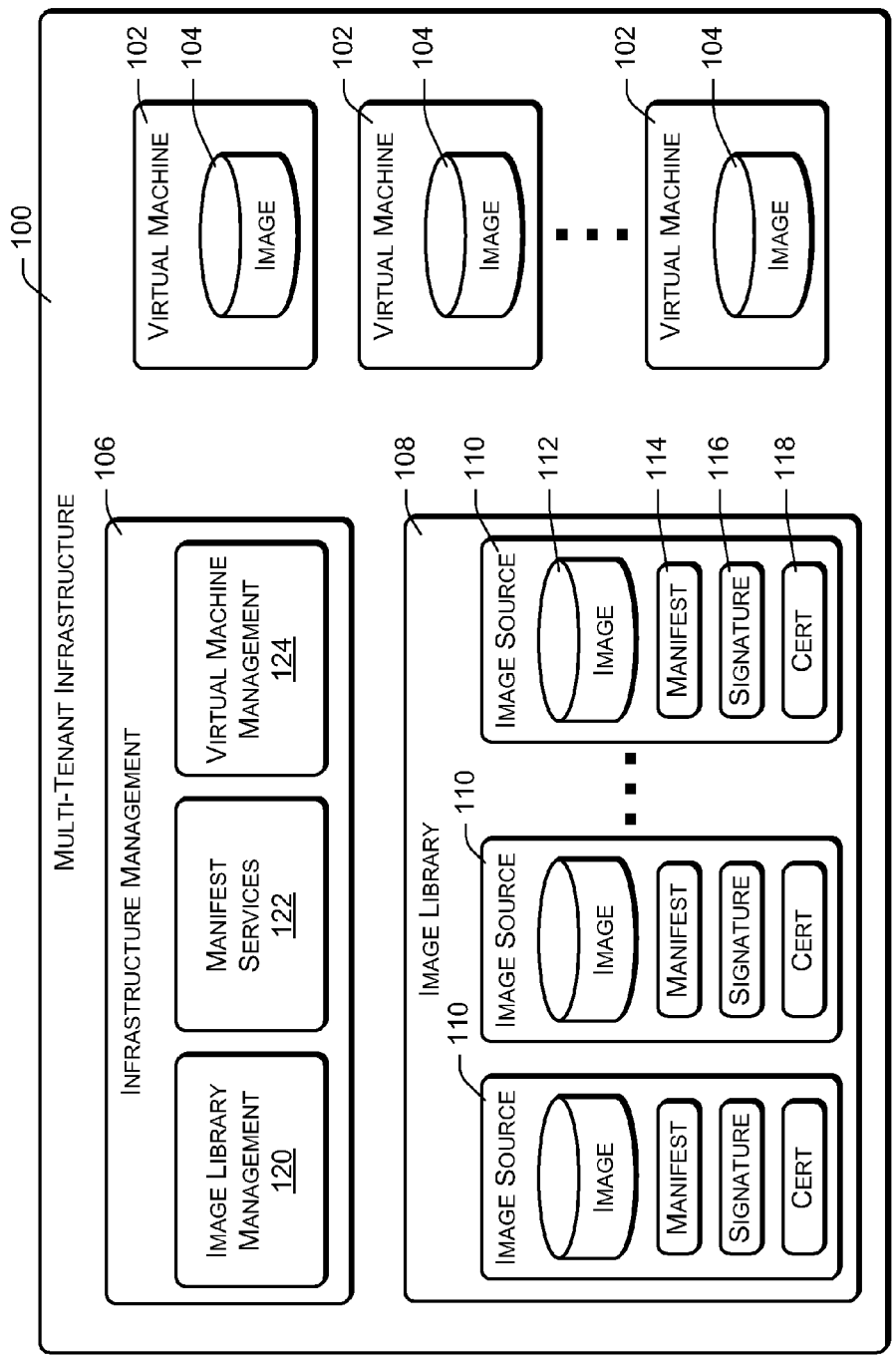
FIG. 1 is a block diagram showing a multi-tenant Infrastructure as a Service (IaaS) environment and an example of machine image in such an environment.

FIG. 1 illustrates an example environment in which these techniques may be carried out. The environment comprises a multi-tenant infrastructure service or resource provider 100, which may be accessed by multiple developers or tenants to host applications such as network or Internet applications. An application may be implemented on behalf of a developer by one or more virtual machines 102, which in turn are created or instantiated based on machine images 104 specified by the developer.

The infrastructure service 100 may include various types of management components and functionality, which are represented generally in FIG. 1 as infrastructure management 106. Generally, the infrastructure management 106 may be accessed by a developer to create, monitor, and control the virtual machines 102. The infrastructure management 106 may also provide support for the storage, retrieval, and validation of virtual machine images, as will be described in more detail below.

The infrastructure service 100 may implement or have access to an image library 108, which may contain or reference a plurality of image sources 110. Each image source 110 may include or reference a virtual machine image 112. The virtual machine images 112 may be obtained and used by or on behalf of developers when creating the virtual machines 102.

The infrastructure service 100 may implement the image library 108 as a resource for customers of the infrastructure service 100. Alternatively, the image library 108 may be implemented apart from the infrastructure service 100, such as by other providers. In some environments, developers may have access to multiple image libraries, provided by different developers or image vendors. In some environments, developers may access the image library 108 through components and functionality of the infrastructure management 106.

In addition to the machine image 112, each image source 110 may include or be associated with an image manifest 114. The image manifest 114 may enumerate or identify executable components of the machine image 112. For example, executable components may be identified by their filenames, process identifiers, and/or process names. The image manifest 114 may also indicate characteristics of the identified executable components, such as permissions, capabilities, checksums, sizes, sources, creators, and so forth.

In some implementations, the manifest 114 of the image source 110 may comprise one or more structured text files. For example, the manifest 114 may be a text file that is formatted in accordance with an available structured language, such as JSON (javascript object notation) or XML (extensible markup language).

Each image source 110 may also include or specify a verifiable signature 116 corresponding to the manifest 114. The signature 116 may be a cryptographic signature that can be inspected to verify the authenticity of the manifest 114. In particular, the signature 116 may be used to verify the source or provider of the manifest and/or image 112, and may also be used to establish that the manifest 114 has not been altered since the signature 116 was generated.

The image source 110 may also include or identify a certificate 118 of the entity providing the signature 116. The certificate 118 may be a PKI (public key infrastructure) certificate, which can be verified through a chain of trust to a trusted certificate authority. The certificate 118 may identify a particular entity, and may specify one or more cryptographic keys that allow verification that the signature 116 was produced by the entity. For example, the certificate 118 may specify a public key portion of a public/private key pair that is associated with the entity identified by the certificate. The public key portion may be used in conjunction with cryptographic techniques to verify that the entity identified by the certificate 118 was the source of the signature 116.

The infrastructure management 106 may support use of the image library 108 by users or consumers of machine images 112. The infrastructure management 106 may also support use of the image library 108 by providers or vendors of the machine images 112. As examples of such management services or functional aspects that may be provided by the infrastructure management 106, FIG. 1 shows an image library management component 120, a manifest services component 122, and a virtual machine management component 124. Note that the specific division of responsibilities shown in FIG. 1 and described below is intended only as an example, and that the functionality described with reference to the infrastructure management 106 may be allocated and implemented in various different ways, by various different systems and components.

The image library management 120 may be configured to perform functions relating to storage and retrieval of image sources 110. For example, the image library management may expose APIs (application programming interfaces) that are accessible by vendors and other providers of machine images, allowing such providers to submit and store machine images 112 in the image library 108. The image library management 120 may also expose APIs that are accessible by users or consumers of the machine images 112, allowing developers to obtain the machine images 112 and to use the machine images 112 when instantiating virtual machines 102.

The manifest services 122 may be configured to perform functions relating to the creation and/or verification of image manifests, such as generating the manifests 114 and signatures 116, and associating or assembling the various components of the image source 110. The manifest services 122 may expose APIs that are accessible by producers and consumers of the machine images 112 for these purposes.

In some embodiments, the manifest services 122 may include an executable module for installation on and execution by a virtual machine. Such a module may be executed in conjunction with initialization, startup, or booting of the virtual machine, whereupon it may inspect or examine the virtual machine to identify the executable components of the virtual machine. This functionality may be used to generate the manifests 114, as well as to inventory newly instantiated virtual machines in order to verify the authenticity and integrity of their machine images 104.

The virtual machine management 124 may be configured for access by users to create and configure the virtual machines 102. The virtual machine management 124 may expose APIs or other control mechanisms allowing customers of the infrastructure service 100 to specify machine images 104 and to create virtual machines 102 based on the specified machine images 104. In certain embodiments, a customer may specify one of the library images 112 to be used as a virtual machine image 104 when creating a new virtual machine 102.

Figure 2:
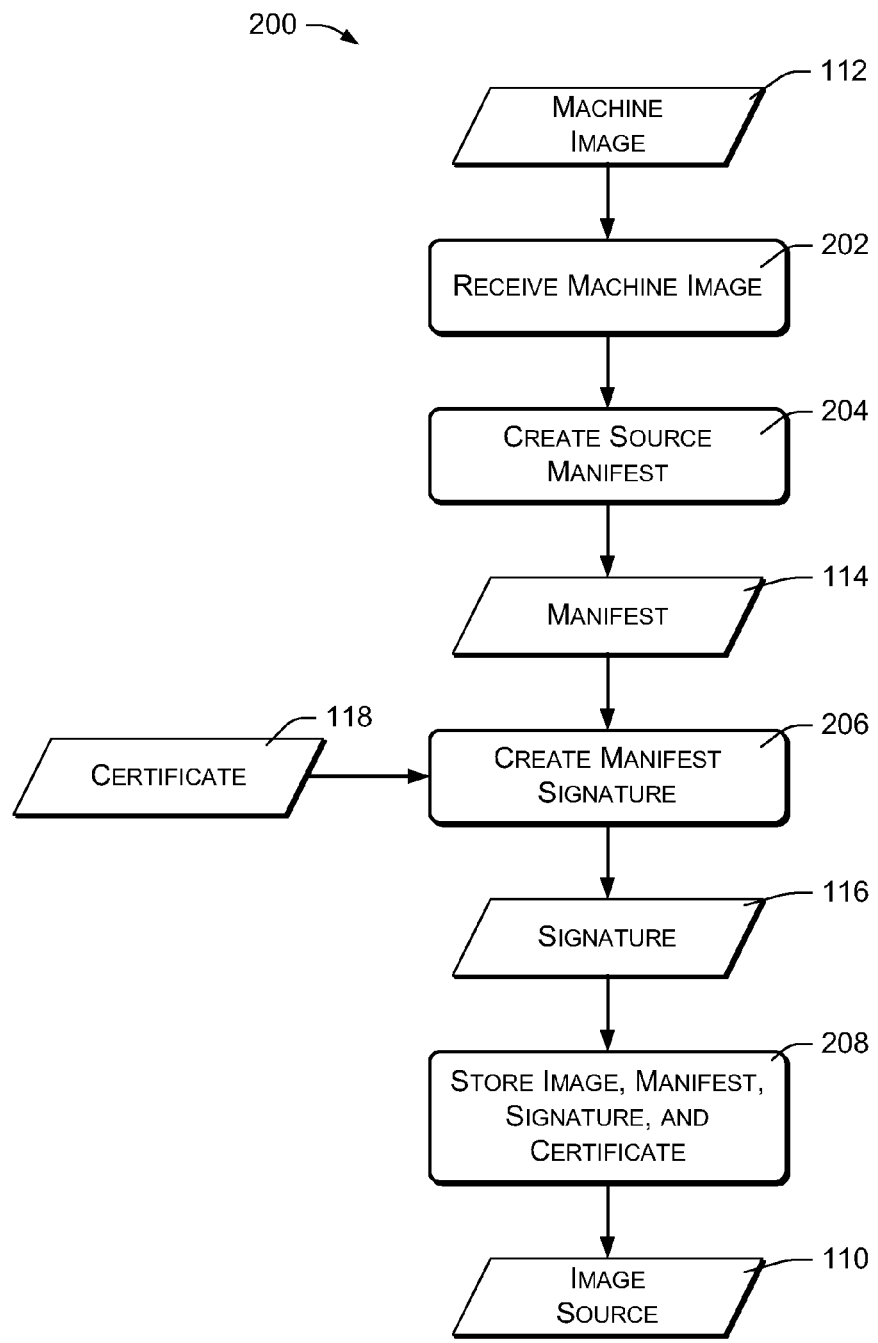
FIG. 2 is a flowchart illustrating an example process of creating an image source in the environment shown by FIG. 1.

FIG. 2 illustrates an example method 200 of creating an image source 110. The actions of FIG. 2 may for example, be performed by the image library management 120 of FIG. 1, in conjunction with the manifest services 122. Note that although the image sources 110 are illustrated as being part of the infrastructure service 100, actual storage of the components of the image sources 110 may take place outside of the infrastructure. In other words, certain illustrated components of the image source 110 may be referenced by source or location, rather than being stored by the infrastructure service 100.

An action 202 may comprise receiving the machine image 112 from an entity such as a developer, customer, vendor, etc. The machine image 112 may be submitted or specified through APIs of the image library management 120. In some embodiments, the machine image 112 may be specified by referencing an existing virtual machine. In such embodiments, the machine image 112 may comprise the memory image of the referenced virtual machine, which the image library management 120 may copy for storage within the image library 108.

An action 204 may comprise creating the source manifest 114. This may be performed in some embodiments by the manifest services 122, by examining the state of an existing virtual machine that has been created based on the machine image 112. In some cases, the image library management 120 may create a virtual machine based on the machine image 112, specifically for the purpose of inventorying the executable components of the virtual machine and for creating the manifest 114. An executable inventory module may be installed to execute on the virtual machine as it boots, to create the manifest 114 based on analysis of the virtual machine.

As mentioned above, the source manifest 114 may be a text file or object such as an XML file, or may be formatted in accordance with any other agreed upon standard. The source manifest 114 may identify executable components or processes by their process identifiers, by their filenames, or by other characteristics. Various data or metadata regarding individual components or processes may also be included or enumerated within the source manifest 114, such as checksums, file sizes, permissions, capabilities, and so forth.

An action 206 may comprise signing the source manifest 114 to create the signature 116. This action may in some embodiments be performed on behalf of a developer by the manifest services 122. The signature 116 may be created using various different technologies and protocols, including cryptographic techniques. For example, some embodiments may generate a hash of the manifest and encrypt the hash to produce the signature 116. Some embodiments may utilize a public key infrastructure (PKI), which is based on certificates that bind entities to public/private asymmetric key pairs. In this case, a hash of the manifest 114 may be signed or encrypted using the private portion of the key pair associated with the certificate 118. Successful subsequent decryption of the signature using the public portion of key pair, specified by the certificate 118, will verify that the signature was created by the entity specified by the certificate 118. The certificate 118 itself can be verified through a chain of trust rooted in a trusted entity, in accordance with conventional PKI techniques.

As an example, the certificate 118 and signature 116 may comply with and be generated in accordance with the X.509 PKI standard.

An action 208 may comprise storing the machine image 112, the certificate 118, the signature 116, and the source manifest 114 to create the image source 110 within the image library 108. As illustrated, multiple image sources 110 may be stored by and available from the image library 108.

Figure 3:
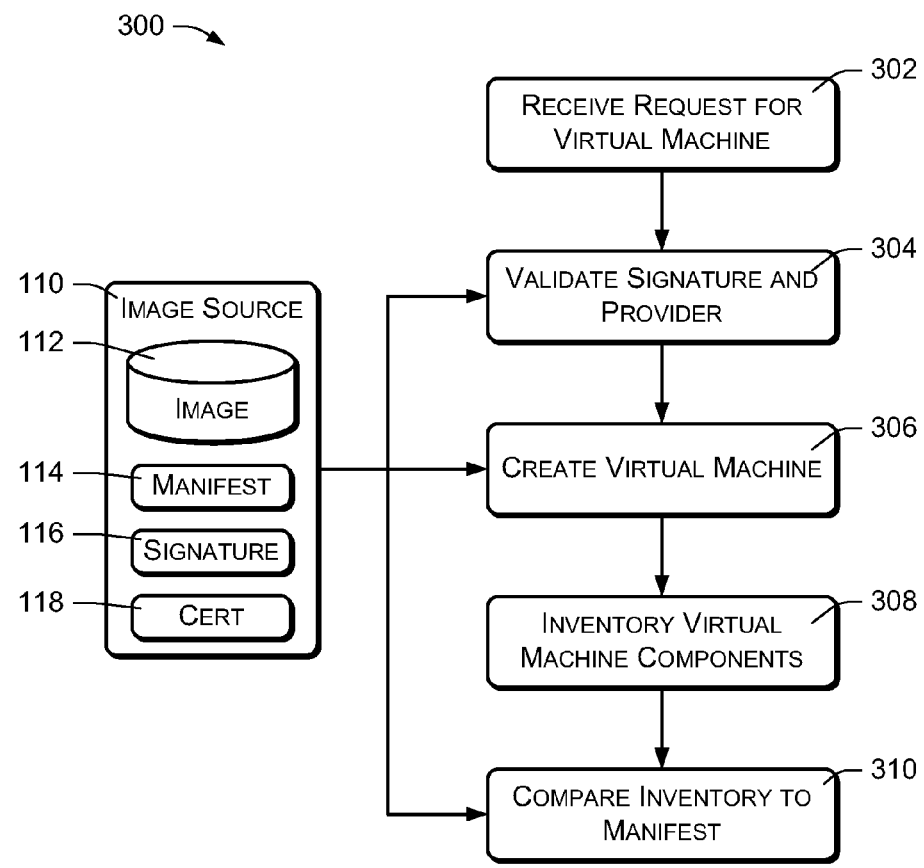
FIG. 3 is a flowchart illustrating an example process of creating a virtual machine in the environment shown by FIG. 1.

FIG. 3 shows an example method 300 of creating a virtual machine based on an image source 110 of the image library 108, which may include validating a machine image 112 stored in or specified by the image library 108. The method 300 may be performed by the virtual machine management 124. In addition, the manifest services 122 may be used for the creation and verification of manifests.

An action 302 may comprise receiving a request for the creation of a virtual machine 102. The request may be received from a developer, user, or customer associated with the infrastructure service 100, and may specify one of the image sources 110 stored by the image library 108. The virtual machine management 124 may expose APIs for this purpose.

In response to receiving the request, an action 304 may comprise verifying or validating the signature 116 of the manifest 114 associated with the specified image source 110. This may be performed in some environments by creating a hash of the manifest 114 using an agreed upon protocol, encrypting the hash, and verifying that the encrypted hash matches the signature 116. The validation 304 may be performed in accordance with one or more standards or protocols, such as the X.509 PKI standard mentioned above.

The action 304 may also comprise verifying that the certificate 118 can be traced to a trusted source, and that the certificate 118 specifies a provider that is trusted. Again, this can be performed in accordance with standards such as the X.509 PKI standard.

An action 306 may comprise creating the virtual machine 102 based on the image 112 indicated by the specified image source 110.

An action 308 may comprise inventorying the created virtual machine to identify its executable components. As discussed above, this may comprise executing an inventory module in conjunction with startup or booting of the virtual machine 102. Such an inventory module, which may be provided by the manifest services 122 or virtual machine management 124, may be configured upon startup to examine the state of the virtual machine 102 and to produce a list of executable components. Executable components may be identified by process identifier, filename, or other means.

An action 310 may comprise comparing the inventory of identified executable components with the manifest 114, to determine whether the virtual machine 102 has been created with a valid and trusted machine image. If the inventory and the manifest do not match, the newly created virtual machine may be disabled or prevented from operating. The comparison of action 310 may be performed by the virtual machine management 124, or by the inventory module executing on the virtual machine 102.

Figure 4:
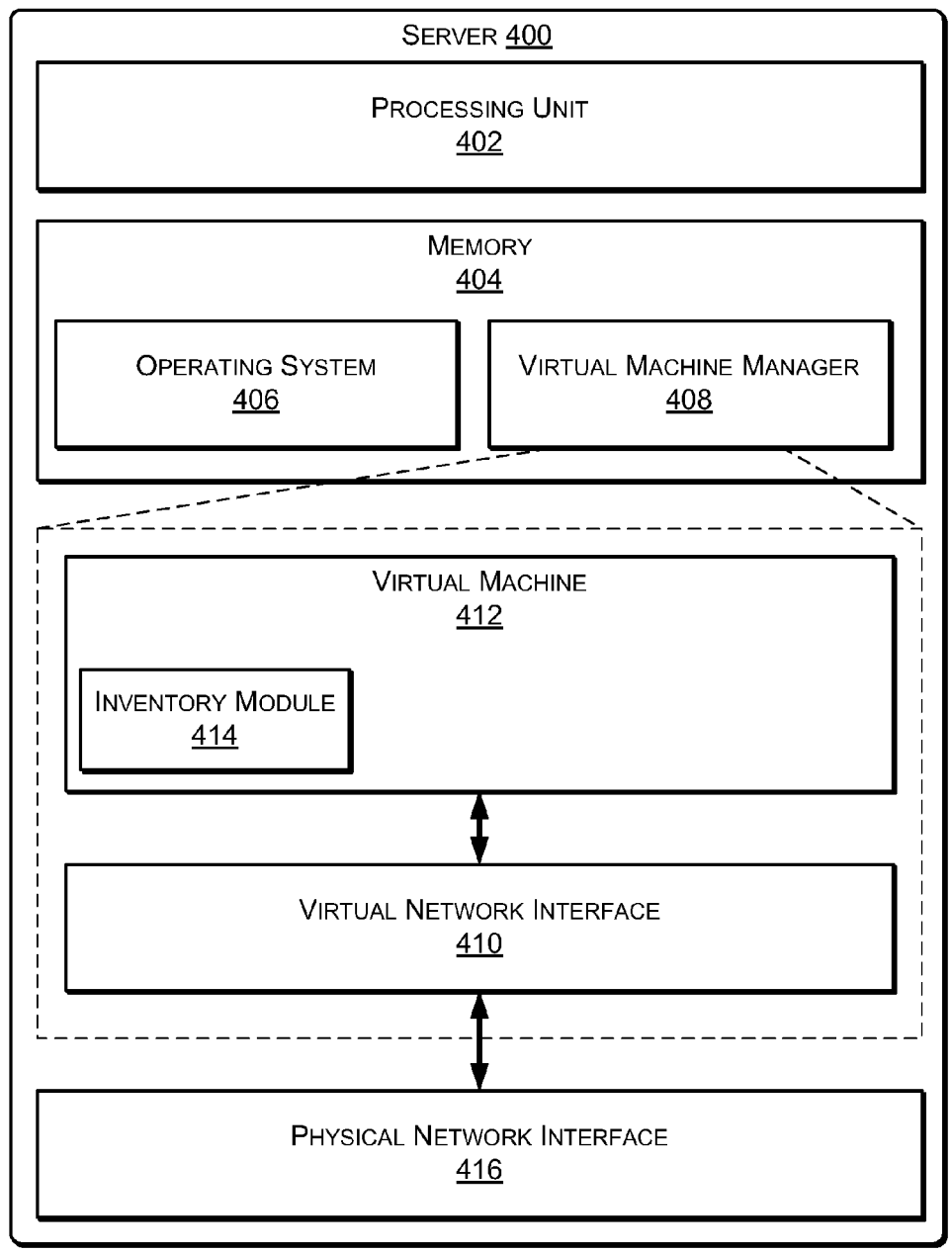
FIG. 4 is a block diagram illustrating relevant elements of a physical server that may be used in conjunction with the techniques described herein.

FIG. 4 illustrates relevant components of a physical server 400 that may form part of the environment described above. An IaaS provider may provide or be implemented by one or more such servers. In a very basic configuration, an example server 400 may comprise a processing unit 402 composed of one or more processors, and memory 404. Depending on the configuration of the server 400, the memory 404 may be a type of computer storage media and may include volatile and nonvolatile memory. Thus, the memory 404 may include, but is not limited to, RAM, ROM, EEPROM, flash memory, or other memory technology. The memory 404 may also include remote storage volumes.

The memory 404 may be used to store any number of functional components that are executable by the processing unit 402. In many embodiments, these functional components comprise instructions or programs that are executable by the processing unit 402, and that when executed implement operational logic for performing the actions that are described above as being performed within or by the IaaS. In addition, the memory 404 may store various types of data that are referenced by executable programs.

Functional components stored in the memory 404 may include an operating system 406 and a virtual machine manager 408 that provides and manages virtual instances within the server 400. Relevant logical functionality provided by the virtual machine manager 408 is shown within a dashed box within the server 400. Such logical functionality may include a virtual network interface 410 and one or more virtual machine instances 412 (only one of which is shown). In some embodiments, each virtual machine 412 may be configured with an inventory module 414 that inventories and reports executable components of the virtual machine 412.

The server 400 may also have a physical network interface 416, for network communications outside of the physical server itself.

In addition to implementing individual virtual machines, one or more servers such as shown by FIG. 4 may be used to implement higher-level management of the infrastructure service 100, such as the functionality of the infrastructure management 106.

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A resource provider, comprising:
 a plurality of stored machine images;
 source manifests corresponding respectively to the stored machine images, wherein each source manifest indicates executable components of the corresponding stored machine image;
 verifiable signatures corresponding respectively to the source manifests;
 one or more processors configured to perform actions comprising:
  receiving, using a application programming interface, a plurality of machine images;
  storing the plurality of machine images as the plurality of stored machine images;
  using a specified one of the stored machine images, creating a virtual machine associated with the specified one of the stored machine images;
  installing an inventory module to execute on the virtual machine associated with the specified one of the stored machine images;
  executing the inventory module in conjunction with a startup or booting of the virtual machine associated with the specified one of the stored machine images;
  generating, by the inventory module, a source manifest corresponding to the specified one of the stored machine images;
  signing the source manifest corresponding to the specified one of the stored machine images to generate a verifiable signature;
  receiving a request to create a virtual machine based at least in part on the specified one of the stored machine images;
  inventorying, by the inventory module, the specified one of the stored machine images to identify executable components of the specified one of the stored machine images; and
  validating the specified one of the stored machine images by (a) verifying the signature of the source manifest corresponding to the specified one of the stored machine images and (b) comparing the identified executable components of the specified one of the stored machine images with the source manifest corresponding to the specified one of the stored machine images.

2. The resource provider of claim 1, the actions further comprising creating the virtual machine based at least in part on the specified one of the stored machine images.

3. The resource provider of claim 1, wherein the validating is performed upon initialization of the virtual machine.

4. The resource provider of claim 1, wherein verifying the signature of the source manifest comprises cryptographically determining that the signature was generated on behalf of a trusted entity.

5. The resource provider of claim 1, further comprising one or more certificates corresponding to trusted entities that have generated the verifiable signatures, wherein verifying the signature of the source manifest is based at least in part upon information specified by the one or more certificates.

6. The resource provider of claim 1, the actions further comprising:
 receiving submitted machine images;
 storing the submitted machine images;
 creating the source manifests based at least in part on the submitted machine images; and
 creating the verifiable signatures based at least in part on the created source manifests.

7. A method performed by a virtual machine with respect to a first machine image, the method comprising:
 under control of one or more processors configured with executable instructions,
  receiving a plurality of machine images;
  storing the plurality of machine images;
  using a first machine image of the plurality of stored machine images, creating a first virtual machine associated with the first machine image;
  installing an inventory module to execute on the first virtual machine associated with the first machine image;
  executing the inventory module in conjunction with a startup or booting of the first virtual machine associated with the first machine image;
  generating, by the inventory module, a source manifest corresponding to the first machine image;
  signing the source manifest corresponding to the first machine image to generate a verifiable signature;
  receiving a request to generate a second virtual machine based at least in part on the first machine image;
  inventorying, by the inventory module, the first machine image to identify executable components of the first machine image; and
 validating the first machine image by (a) verifying the signature of the source manifest corresponding to the first machine image and (b) comparing the identified executable components of the first machine image with the source manifest corresponding to the first machine image.

8. The method of claim 7, wherein the method further comprises validating the source manifest comprises by verifying the signature of the source manifest.

9. The method of claim 8, wherein validating the source manifest comprises identifying a source of the first machine image based at least in part on the signature associated with the source manifest.

10. The method of claim 8, wherein validating the source manifest comprises identifying a trusted source of the first machine image.

11. The method of claim 8, wherein validating the source manifest is based at least in part on a public key infrastructure.

12. A method comprising:
 under control of one or more processors configured with executable instructions,
  receiving, using an application programming interface, a plurality of machine images;
  storing the plurality of machine images;
  using a first machine image of the plurality of stored machine images, creating a first virtual machine associated with the first machine image;
  installing an inventory module to execute on the first virtual machine;
  executing the inventory module in conjunction with a startup or booting of the first virtual machine;
  generating, by the inventory module, a source manifest corresponding to the first machine image;
  signing the source manifest corresponding to the first machine image to generate a verifiable signature;
  receiving a request to create a second virtual machine based at least in part on the first machine image;
  inventorying, by the inventory module, the first machine image to identify executable components of the first machine image; and
 validating the first machine image by (a) verifying the signature of the source manifest corresponding to the first machine image and (b) comparing the identified executable components of the first machine image with the source manifest corresponding to the first machine image.

13. The method of claim 12, further comprising:
    validating the first virtual machine by verifying the signature associated with the source manifest of the specified one of the stored machine images.

14. The method of claim 12, wherein the validating is performed by the first virtual machine during initialization of the first virtual machine.

15. The method of claim 12, wherein the signatures are verifiable based at least on part on information specified by one or more cryptographic certificates.

16. The method of claim 12, further comprising storing one or more certificates with the source manifest, wherein the signature is verifiable based at least on part on information specified by the one or more certificates.

17. The method of claim 12, wherein the first machine image is inventoried to identify executable components of the first machine image in response to receiving the request to create the second virtual machine.

18. The method of claim 12, further comprising:
    in response to (i) receiving the request to create the second virtual machine and (ii) validating the first machine image, creating the second virtual machine based at least in part on the first machine image.

19. The resource provider of claim 1, wherein the source manifest corresponding to the specified one of the stored machine images comprises one of a text file or an XML file, which identifies executable components of the specified one of the stored machine images.

20. The resource provider of claim 1, wherein:
    the source manifest corresponding to the specified one of the stored machine images comprises a list of the executable components of the specified one of the stored machine images;
    inventorying the specified one of the stored machine images comprises inventorying the specified one of the stored machine images to list the executable components of the specified one of the stored machine images; and
    the comparing comprises comparing (i) the list of the inventoried executable components of the specified one of the stored machine images and (ii) the list of the executable components, as included in the source manifest.

21. The resource provider of claim 20, wherein:
    the list of the executable components of the specified one of the stored machine images, as included in the source manifest, comprises one or more of a filename, a process identifier, or a process name associated with individual ones of the executable components of the specified one of the stored machine images.

22. The resource provider of claim 20, wherein:
    the list of the executable components of the specified one of the stored machine images, as included in the source manifest, comprises metadata associated with one or more of the executable components of the specified one of the stored machine images, wherein the metadata comprises one more of a checksum, a file size, a permission or a capability associated with at least one of the executable components of the specified one of the stored machine images.

* * * * *